United States Patent [19]

D'Aoust

[11] Patent Number: 4,654,182

[45] Date of Patent: Mar. 31, 1987

[54] APPARATUS FOR DISTRIBUTING THE HEAD LOAD TO THE FIRST WALL FROM THE PLASMA IN AN OTHE-TYPE HIGH-ENERGY PLASMA DEVICE

[75] Inventor: James R. D'Aoust, San Diego, Calif.

[73] Assignee: GA Technologies Inc., San Diego, Calif.

[21] Appl. No.: 767,775

[22] Filed: Aug. 20, 1985

[51] Int. Cl.[4] .............................................. G21B 1/00
[52] U.S. Cl. .................................... 376/136; 376/150
[58] Field of Search ....................... 376/136, 150, 125; 310/178, 177, 46; 366/273, 274

[56] References Cited

U.S. PATENT DOCUMENTS

| | | | |
|---|---|---|---|
| 1,052,709 | 5/1913 | Badger . | |
| 2,865,660 | 12/1958 | Zallea | 285/229 |
| 3,105,031 | 9/1963 | Thonemann et al. | 284/193.2 |
| 3,105,806 | 10/1963 | Thonemann | 284/193.2 |
| 3,135,295 | 6/1964 | Ziebold | 138/121 |
| 3,248,874 | 5/1966 | Grina . | |
| 3,318,336 | 5/1967 | Treiber | 138/121 |
| 4,073,680 | 2/1978 | Kelley | 176/3 |
| 4,260,455 | 4/1981 | Moir | 176/9 |
| 4,269,658 | 5/1981 | Ohkawa | 376/125 |
| 4,396,797 | 8/1983 | Sakuragi et al. | 174/68 C |
| 4,414,176 | 11/1983 | Krauss et al. | 376/136 |

FOREIGN PATENT DOCUMENTS 1045273 9/1983 U.S.S.R. .............................. 376/136

OTHER PUBLICATIONS

Nuclear Technology/Fusion, vol. 2, Jan. 1982, pp. 91-95, Xue et al.
Cohen et al., "Mechanisms Responsible for Topographical Changes in PLT Stainless-Steel and Graphite Limiters", *Nuclear Fusion*, vol. 21, No. 2, (1981).
Ogawa et al., "Experimental and Computational Studies of Reversed-Field Pinch on TPE-1R(M), *Proceedings of 9th Int'l Conf.* ... ", Baltimore, '82, vol. 1, pp. 575-586.
Dobrakhotov et al., "Discharged Parimeters in the TM-G Tokamak, *Proceedings of 9th Int'l Conf. on Plasma Physics* ... ", Baltimore, '82, vol. 3, pp. 229-237.
Abstracts from *Bulletin of the American Physical Society*, vol. 27, p. 1108, 1982; and vol. 28, p. 1097, 1983.

*Primary Examiner*—Harvey E. Behrend
*Attorney, Agent, or Firm*—Fitch, Even, Tabin & Flannery

[57] ABSTRACT

Apparatus for containing plasma in a high energy plasma device includes a vacuum tight liner wall made up, at least in part, by a series of sections each having a closed peripheral wall defining an interior with open ends. Adjacent sections form a plasma path with each section having an inside surface and an outside surface with the interior of the section being generally circular in cross section. A magnet system is provided which includes first conductors positioned outside the section for generating a magnetic field extending inside the section. An armature ring is positioned inside the section with the ring having rollers for engaging the inside surface of the section. The ring also includes current carrying armature conductors extending at an angle to the lines of force of the magnetic field. Armor tiles are carried by the ring facing the plasma path for acting as plasma limiters so that the interaction of magnetic field and the current in the armature conductors causes rotation of the armature ring to prevent damage to the liner wall due to localized heating. A method for protecting a vacuum tight liner wall in a high energy device is also disclosed.

12 Claims, 4 Drawing Figures

APPARATUS FOR DISTRIBUTING THE HEAD LOAD TO THE FIRST WALL FROM THE PLASMA IN AN OTHE-TYPE HIGH-ENERGY PLASMA DEVICE

The present invention relates to plasma devices and, more specifically, to a rotatable limiter for protecting the confinement vessel of the device from damage by the plasma.

BACKGROUND OF THE INVENTION

Vacuum liners for defining a plasma in a high energy plasma device have been constructed using relatively thin wall sections made of stainless steel or Inconel. These sections offer high strength while forming a closed loop having sufficiently high electrical resistance that penetration times are acceptably low for magnetic fields generated by poloidal, toroidal or other associated magnetic systems for containing and energizing the plasma. Unfortunately, the thin sections, when used in a high energy plasma environment, may experience local surface melting upon plasma contact. The melting results in structural weakness and vacuum leaks in the liner.

In one attempt to prevent melting of the sections, short pieces of stainless steel rod limiters were installed on the inside surface of the sections. By absorbing the plasma energy, the rods protected the sections. However, contact with the plasma caused the plasma to deteriorate upon the introduction of metal impurities, which radiate and cause loss of power in the plasma. For further information regarding the structure and operation of such limiters, reference may be made to "Experimental and Computational Studies of Reversed-Field Pinch on TPE-IR(M)", by Ogawa et al. in "Proceedings of the 9th International Conference on Plasma Physics and Controlled Nuclear Fashion Research," Baltimore, 1982 (IAEA, Vienna, 1983), Vol. I, p. 575. Metallic limiters are also shown in U.S. Pat. No. 4,073,680.

In order to avoid the introduction of metal impurities into the plasma, carbon tiles have been used instead of the metal rods. However, the discrete tiles are not readily reliably fastened to the interior of the sections. In another attempt to protect the sections and avoid contamination of the plasma, rings of carbon tiles were placed at spaced locations in the vacuum chamber in the effort to make the plasma contact only the tiles. However, the expected reduction of the heat level on the sections was not found, and arcing occurred between the liner and the tiles which resulted in damage to the liner. For further information regarding such limiters, reference may be made to "Mushroom Limiter Studies in ZT-40M," Downing et al., Bull. Am. Phy. Soc., 27, 1108 (1982), and "Temperature and Resistivity of the ZT-40M RFP with Poloidal Limiters," Haberstich et al., Bull. Am. Phy. Soc., 28, 1097 (1983).

Mirror plasma apparatus has been proposed which utilizes shielding by arc discharge to form a blanket plasma and lithium walls to reduce neutron damage to a solid material wall which rotates to keep a liquid lithium layer against it. For further information regarding the structure and operation of this apparatus, reference may be made to U.S Pat. No. 4,260,455.

SUMMARY OF THE INVENTION

Among the several aspects and features of the present invention may be noted the provision of improved apparatus for containing plasma in a high energy plasma device. Several armature rings are positioned at spaced locations inside a vacuum liner wall, and each ring has conductors which carry current which interact with the magnetic field inside the liner wall, resulting in rotation of the armature rings. Each ring carries armor tiles facing the plasma and serving as plasma limiters. The tiles transfer heat through the ring and the vacuum liner wall. Rotation of the rings results in more even heating of the tiles to prevent damage to the liner wall due to localized heat concentrations. The coefficient of expansion of the material of the armature rings is greater than the coefficient of expansion of the liner wall material so that with heating, the rings expand into firm engagement with the liner wall. This more efficiently permits heat transfer from the armor tiles to a cooling medium disposed outside the liner wall. Continued expansion occurs after the plasma is turned off due to thermal inertia. After cooling, the rings contract into position for rotation in response to the next plasma pulse. Other aspects and features of the present invention will be, in part, apparent and, in part, pointed out specifically in the following specification and accompanying claims and drawings.

Briefly, the apparatus of the present invention includes a vacuum tight liner wall which may be made up of a series of sections each of which has a closed peripheral wall defining an interior with open ends. Adjacent interiors of adjacent sections form a plasma path with each section having an inside surface and an outside surface with the interior being generally circular in cross section. A magnet system has helical conductors disposed outside the liner wall for generating a magnetic field extending inside the liner wall. Armature rings are positioned inside the liner wall with each ring carrying rollers for entering into engagement with the inside surface of the wall. The rings also have current carrying armature conductors extending at an angle to lines of force of the magnetic field. The rings carry armor tiles facing the plasma path which function as plasma limiters (a first wall). The interaction of the magnetic field and the current in the armature conductors results in rotation of the armature rings to prevent damage to the liner wall by localized heat concentration.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
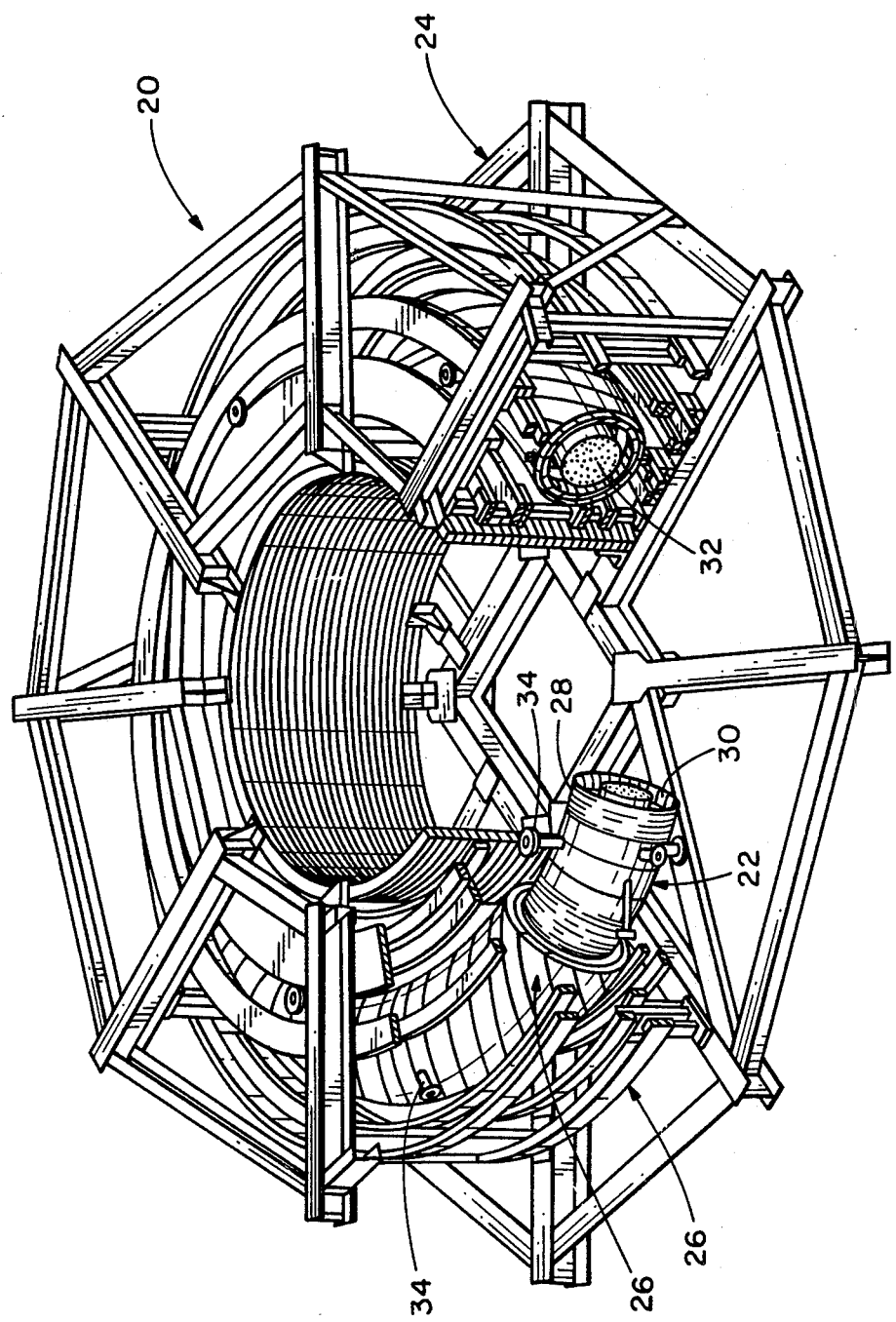
FIG. 1 is an isometric projection of a plasma device including apparatus for containing plasma and embodying various features of the present invention.

Referring now to the drawings, apparatus for containing plasma in a high energy plasma device 20 includes a vacuum tight liner wall generally indicated by reference numeral 22 in FIG. 1. The liner wall 22, which is preferably made of stainless steel, is part of a primary confinement vessel. The liner wall may be disposed within and supported by a shell (not shown) formed of a relatively thick copper wall forming a secondary chamber. Such an arrangement is shown in commonly-assigned U.S. Pat. No. 4,302,284, the teachings of which are incorporated herein by reference. While the wall 22 is exemplarily shown as a torus, it will be appreciated that it can be formed in any desired shape. The device includes a frame 24 for supporting the liner and a magnet system 26 which could be made up of toroidal, poloidal, helical and other coils or windings which may be either of superconductive or normal material. The purposes of the magnet system are to produce and confine the plasma inside the liner wall.

Figure 2:
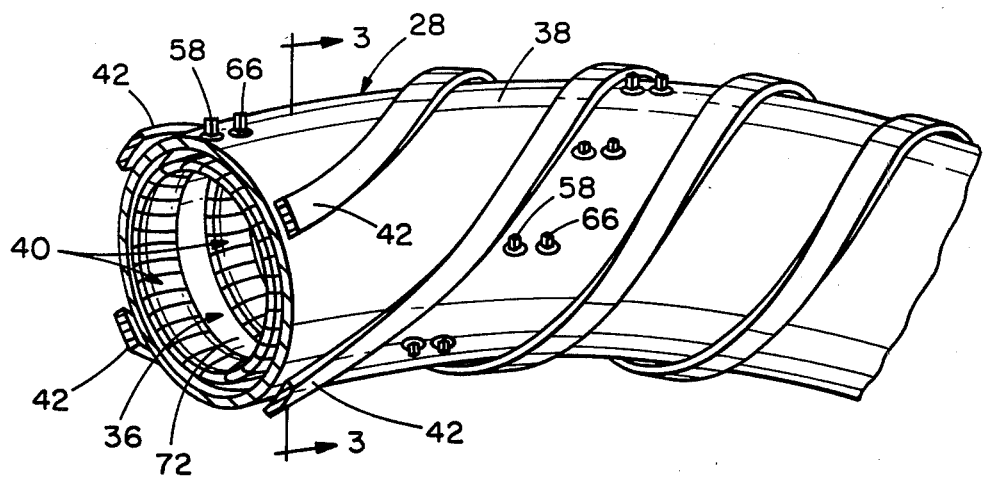
FIG. 2 is an enlarged isometric view of a section of a vacuum liner the inside surface of which is protected from plasma by armor tiles carried by armature rings.

The liner wall is preferably made up of a number of sections 28 with each section 28 having a closed peripheral wall defining an interior 30 with open ends. Adjacent interiors of adjacent sections form a plasma path 32. The sections 28 preferably have a relatively thin wall and have sufficient loop resistance that the penetration times for the magnetic field provided by the magnet system, are acceptably short. Certain of the sections are provided with ports 34 and associated piping for passage of the constituents of the plasma and for applying a vacuum. As shown in FIG. 2, each section 28 includes an inside surface 36 and an outside surface 38 with its interior being generally circular in cross section.

Theoretically, a properly designed magnet system would provide sufficiently homogeneous magnetic fields that the plasma is contained in the liner wall out of contact with the liner wall inner surface. However, available magnet systems do not provide such ideal fields and the plasma contacts the liner wall inner surface. When the plasma contacts the inner surface of a section 28, energetic particles from the plasma impinge on the wall resulting in localized heating and causing melting and loss of vacuum integrity. Additionally metal ions from the sections enter and contaminate the plasma. The introduction of the metal ions into the plasma causes increased radiation resulting in power loss in the plasma.

In order to protect the liner wall from damage due to contact by the plasma, the apparatus of the present invention includes a plurality of armature rings 40 disposed at spaced locations inside the liner wall. Each ring 40 includes means for entering into rolling engagement with the inside surface 36 of one of the segments 28 and each ring includes current-carrying armature conductors extending at an angle to lines of force extending inside the section and provided by the helical coil portion of the magnetic system 26. More specifically, as shown in FIG. 2, the magnetic system includes a plurality of spaced conductors 42 helically wound about the outer surface of the liner wall 22. For purposes of illustration, four conductors 42 are shown which carry direct current with adjacent conductors carrying current in opposite directions. As suggested in FIG. 3, the conductors 42 provide magnetic lines of flux which extend inside each section, generally normal to the plasma path.

Figure 4:
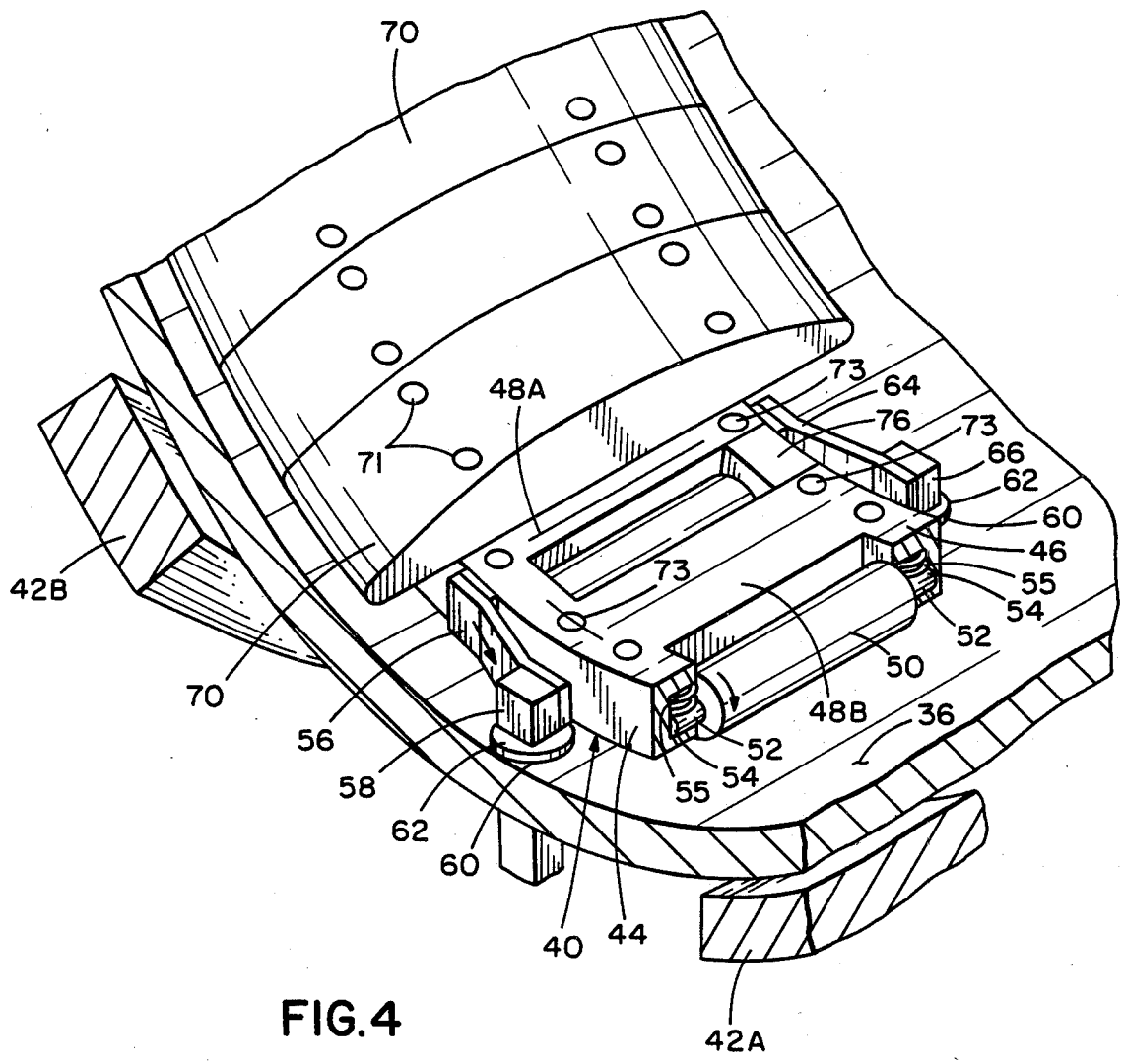
FIG. 4 is an enlarged isometric fragmentary view of an armature ring and the section, illustrating components of the ring and conductors for supplying direct current to the ring.

Referring to FIG. 4, the armature ring 40 is made of electrically conductive material and includes a first annular end 44, a second annular end 46 and a plurality of spaced bars 48, extending in the direction of the plasma path and constituting the armature conductors, interconnecting the annular ends 44 and 46. Positioned between adjacent bars 48 are rollers 50 having oppositely extending lugs 52 received in cavities 54 formed by channel-shaped sections of the annular ends between the bars 48. A spring 55 is positioned inwardly of its corresponding lug to bias the rollers outwardly into engagement with the inside surface 36 of the section 28 in which the armature ring is positioned. Accordingly, the armature uses the section inside surface as a race on which to rotate. The rollers are preferably formed of an electrically insulative material such as a ceramic. In the event the inner surface 36 is not circular in cross section, a track which did provide a circular race for the armature, could be attached to the liner wall for supporting the armature ring.

The apparatus of the present invention also includes means for supplying direct current to the bars 48 of the armature ring. As shown in FIG. 4, a first brush 56 is mounted on a first conductive standard 58 extending through a hole 60 in the liner wall inside an insulative bushing 62. The bushing 62 and standard 56 completely fill the hole 60 to prevent vacuum leaks. The brush 56 slidably engages the first annular end 44 of the armature ring 40. Similarly, a second brush 64 is mounted on a second conductive standard 66 extending through another hole 60 in the liner wall inside an insulative bushing 62. The second brush 64 slidably engages the second annular end 46 of the armature ring at a position generally aligned with the location of engagement of the first brush 56.

Figure 3:
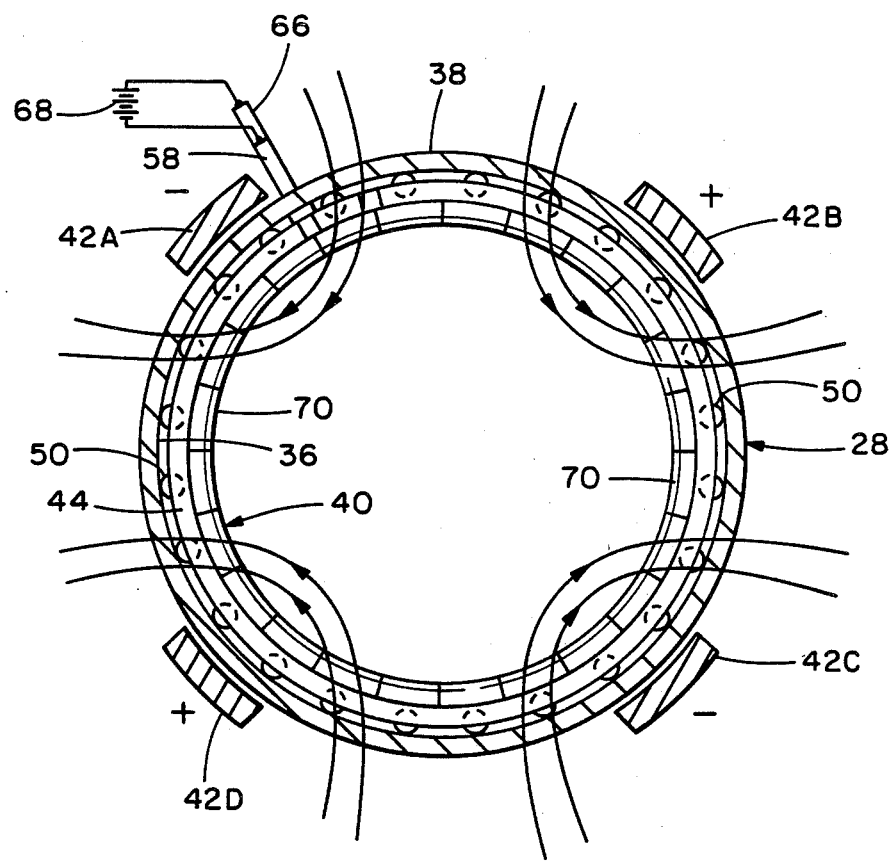
FIG. 3 is a cross-sectional view taken generally along line 3—3 in FIG. 2 illustrating magnetic lines of force extending inside the section from a magnet system positioned outside the section.

The conductive standards 58 and 66 are connected to a source of direct current 68 as shown in FIG. 3. Due to the electrical resistance of the armature annular ends 44 and 46, more current flows through the bar 48A closest the areas of contact of the brushes with the corresponding annular ends, than through any other bar 48. The brushes 56 and 64 are angularly displaced relative to the helical conductor 42A so that flux lines resulting from current in conductor 42A intersect the bar 48A closest the brushes generally radially with respect to the center of the section 28. The interaction of the magnetic flux and the current through the bar 48A results in a force, the Lorenz force, which is in a direction perpendicular to both the current in bar 48A and the flux lines. Thus, as in a direct current motor, the armature ring rotates. Preferably another set of brushes is located diametrically across the section 28 to provide current to another bar located 180 degrees from bar 48A. The force resulting from the interaction of this current and magnetic flux provided by conductor 42C aids the first force and results in a more balanced application of forces to the armature ring. The presence of the brushes bearing on the sides of the armature ring limit it to poloidal rotation and prevent movement of the ring in the direction of the plasma path. While the magnet system 26 generates fields other than those shown in FIG. 3, the rings 40 are restrained from other than rotational movement in a plane extending transversely to the plasma path.

The armature ring carries a protective coating in the form of a plurality of armor tiles 70 facing the plasma path. These tiles preferably abut one another and form a ring fully covering the armature ring with respect to the plasma path and extend laterally over the brushes and standards to form a first wall for contact by the plasma. These tiles are formed of a material having a higher melting temperature than the material from which the liner wall 22 is formed. The tiles are preferably formed of silicon carbide coated carbon, ceramic material or a nickel-chromium-iron alloy, with coated high density carbon being most preferable. The tiles 70, can be affixed to the ring by, for example, pins 71 having heads received in countersunk apertures in the tiles, with the shanks of the pins received in an interference fit in apertures 73 in the armature ring 40.

In the case of the liner wall 22 in the shape of a torus, the number of rings 40 employed is preferably sufficient so that, on the inner side of the torus, the tiles of adjacent rings almost touch. Arcuate surface segments 72 of the torus are not covered by the tiles, as shown on FIG. 2. Although the tiles do not overlie the surface segments 72, under many operating conditions they substantially protect the segments from impingement by high energy charged particles, which leave the plasma and give up their energy to the first surface they strike. This is because these particles predominantly follow the direction of the composite magnetic field. Typically the radial component of the composite magnetic field is much smaller than the toroidal component. Thus the paths taken by most of the escaping charged particles intersect the liner wall at shallow angles. These angles are so shallow that most charged particles strike the tiles which are disposed above the level of the segments 72 and not the segments. Put another way, although the segments are visible in plan, they are in the shadow of the tiles in view of the direction of the plasma particles.

Each armature ring 40 is sized to lie closely adjacent but spaced from the inside surface 36 of the respective section 28 when the section and the ring are at ambient temperature to enable the ring to rotate inside the section on the rollers 50. The armature ring, however, is made of a material having a coefficient of thermal expansion somewhat greater than that of the material forming the section 28. Accordingly, as heat from the plasma is transferred from the tiles 70 to the armature ring 40, the armature ring expands into full surface engagement with the liner wall causing the ring to stop rotating, and heat from the armature ring to transfer to the liner wall. With a pulsed plasma, this full surface engagement occurs shortly after the plasma is turned off, due to thermal inertia. This is analogous to the brake shoe expanding against the wheel drum in an automobile brake. The outside surface of the liner wall is actively cooled, for example, by running coolant pipes (not shown), around the liner wall. With the rings firmly against the liner wall, heat is efficiently transferred from the tiles to the coolant through the ring and the liner wall. As the armature ring cools, it shrinks and the springs 55 bias the rollers outwardly to center the ring inside its corresponding section 28.

While the first and second annular ends 44, 46 of the ring have been described as being made entirely of conductive material, the portions of the ends disposed between the bars could be formed of an electrically insulating material 76 as shown in FIG. 4. The use of insulating components between bars 48 has the advantage of limiting current to the particular bar aligned with the brushes 56 and 64. However, heat transfer from the tiles may be reduced and the insulating material should have a thermal coefficient of expansion close to that of the conductive material of the annular ends 44 and 46.

Operation of the apparatus of the present invention is as follows: Energization of the helical conductors 42 results in formation of a magnetic field extending inside the liner wall 22. When direct current is supplied to the bars 48 of the armature ring 40, the interaction of the current in the bars and the magnetic field results in a force which turns the ring 40 in the poloidal direction. The armored tiles carried by the armature ring act as plasma limiters (a first wall) and are heated. Heat transfer from the tiles to the armature ring causes expansion thereof resulting in a armature ring stopping rotation in full surface contact with the liner wall. This allows heat to be transferred from the tiles to a cooling means, disposed outside the liner wall, through the armature ring and the liner wall. It will be appreciated that the rings may be rotated over a broad range of frequencies and rotation of the rings tends to spread the plasma heat load over the entire surface of the liner wall to prevent damage to the liner wall resulting from a localized heat concentration. The plasma may be of pulsed operation with the plasma being turned off prior to expansion of the ring against the liner wall. In this case, the heat flow through the tiles, even with the plasma turned off, may be sufficient to result in expansion of the armature ring against the liner wall. After the heat has been transferred out through the coolant, the spring loaded rollers center the armature ring after it has contracted and place the ring in position for another plasma discharge.

As a method, the present invention includes several steps:

a. An armature ring 40 is rotatably mounted inside one of the sections 28 making up the liner wall 22. The ring 40 carries rollers 50 for engaging the inside surface of the section 28 and further includes armature conductors 48 extending at an angle to lines of force provided by a magnet system in the high energy plasma device 20.

b. Armor tiles 70 are affixed to the ring 40 facing the plasma path 32 from the liner wall 22 for acting as plasma limiters.

c. Direct current is caused to flow through the armature conductors 48 so that the interaction of the magnetic field and the current in the armature conductors results in rotation of the armature ring 40 to prevent damage to the section due to localized heat concentration.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for containing plasma in a high energy plasma device, said apparatus comprising:

a confinement vessel having a wall defining a closed interior including a plasma path, said wall having an inside surface;

a magnet system including first conductors disposed outside said vessel for generating a magnetic field extending inside said closed interior;

an armature ring disposed inside said wall;

means for supporting said ring for rotation in a plane extending transversely of said plasma path and for preventing substantial movement of said ring in the direction of said plasma path, said ring including armature conductors extending at an angle to lines of force of said magnetic field;

means for supplying direct current to said armature conductors;

a protective coating carried by said ring and facing said plasma path to provide a first wall whereby the interaction of said magnetic field and the current in said armature conductors causes rotation of said armature ring to prevent damage to said wall due to localized heating.

2. Apparatus as set forth in claim 1 further comprising a plurality of said armature rings disposed at spaced locations along said plasma path.

3. Apparatus for containing plasma in a high energy plasma device, said apparatus comprising:

a vacuum tight liner wall made up, at least in part, by a series of sections, each section having a closed peripheral wall defining an interior with open ends, with adjacent interiors of adjacent sections forming, at least in part, a plasma path, at least one of said sections having an inside surface and an outside surface with its interior being generally circular in section;

a magnet system including first conductors disposed outside said one section for generating a magnetic field extending inside said one section;

an armature ring supported inside said one section, said ring carrying means for entering into rolling engagement with the inside surface of said one section, said ring comprising current carrying armature conductors extending at an angle to lines of force of said magnetic field; and armor tiles carried by said ring and facing said plasma path for acting as plasma limiters whereby the interaction of said magnetic field and the current in the armature conductors causes rotation of said armature ring in said one section to prevent damage to said liner wall due to localized heating.

4. Apparatus as set forth in claim 3 wherein said liner wall defines a torus.

5. Apparatus as set forth in claim 3 further comprising means for supplying direct current to said armature conductors of said armature ring.

6. Apparatus as set forth in claim 5 wherein said armature ring is electrically conductive and comprises a first annular end and a second annular end with said armature conductors comprising spaced bars interconnecting said first and second ends.

7. Apparatus as set forth in claim 6 wherein said means for supplying direct current comprises a first brush mounted on a first conductive standard extending through said liner and slidably engaging said one annular end, and a second brush mounted on a second conductive standard extending through said liner and slidably engaging said second annular end, said brushes functioning to direct current through said bars and to hold said armature ring from substantial axial movement.

8. Apparatus as set forth in claim 6 wherein said means for entering into rolling engagement comprises rollers extending between said first and second annular ends between adjacent bars.

9. Apparatus as set forth in claim 8 wherein each of said annular ends has a plurality of cavities, one cavity in each of said annular ends forming an aligned pair, each roller having a pair of oppositely extending lugs received in a respective pair of cavities to retain the roller.

10. Apparatus as set forth in claim 9 wherein each cavity holds spring means bearing against one of said lugs for biasing its corresponding roller against the interior surface of said one section.

11. Apparatus as set forth in claim 3 wherein said armature ring is formed of material having a greater coefficient of thermal expansion than the coefficient of expansion of the material of said one section so that upon heating, said armature ring expands into engagement with the interior surface of said one section.

12. A method of protecting a vacuum tight liner wall in a high energy plasma device, said liner wall including a section having a closed peripheral wall defining an interior with open ends and forming, in part, a plasma path, said section having an inside surface and an outside surface with said interior being generally circular in section, said plasma device including a magnet system including first conductors disposed outside said section for generating a magnetic field extending inside said section, said method comprising the following steps:

rotatably mounting inside said section an armature ring comprising rollers for engaging said inside surface and further comprising armature conductors extending at an angle to lines of force of said magnetic field;

affixing armor tiles to said ring facing said plasma path for acting as plasma limiters;

causing direct current to flow through said armature conductors whereby the interaction of said magnetic field and the current in said armature conductors results in rotation of said armature ring to prevent damage to said section due to localized heating.

* * * * *

UNITED STATES PATENT AND TRADEMARK OFFICE
CERTIFICATE OF CORRECTION

PATENT NO. : 4,654,182
DATED : March 31, 1987
INVENTOR(S) : James R. D'Aoust

It is certified that error appears in the above-identified patent and that said Letters Patent is hereby corrected as shown below:

In the Title Page:

In the title, line 2, change "HEAD" to --HEAT--;

line 3, change "OTHE-TYPE" to --OHTE-TYPE--.

In respect to the Dobrakhotov et al. reference, change "Parimeters" to --Parameters--.

In the Specification:

Column 1, line 1, change "HEAD" to --HEAT--;

line 4, change "OTHE-TYPE" to --OHTE-TYPE--;

line 37, change "TPE-IR(M)" to --TPE-1R(M)--;

line 39, change "Fashion" to --Fusion--.

Signed and Sealed this

Eleventh Day of August, 1987

Attest:

DONALD J. QUIGG

Attesting Officer    Commissioner of Patents and Trademarks